UNITED STATES PATENT OFFICE.

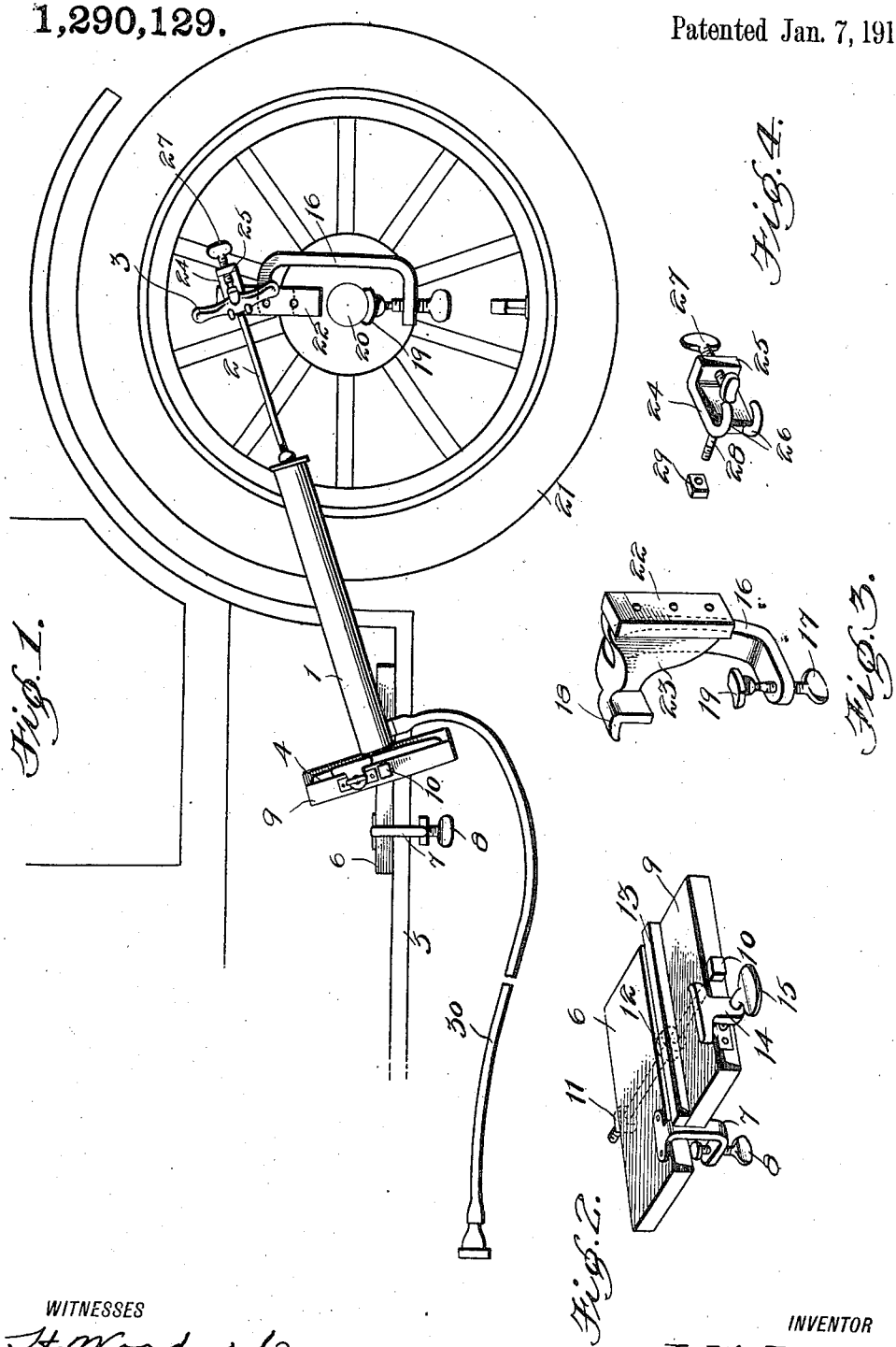

JOHN WINFORD DUNN, OF DOUGLAS, ARIZONA.

PUMP ATTACHMENT.

1,290,129.

Specification of Letters Patent.

Patented Jan. 7, 1919.

Application filed April 5, 1918. Serial No. 226,882.

*To all whom it may concern:*

Be it known that I, JOHN W. DUNN, a citizen of the United States, and a resident of Douglas, in the county of Cochise and State of Arizona, have made certain new and useful Improvements in Pump Attachments, of which the following is a specification.

My invention is an improvement in pump attachments, and has for its object to provide an attachment of the character specified especially adapted for connection to an air pump of an automobile, in such manner that the pump will be operated by the turning of one of the wheels, the wheel being jacked up for this purpose.

In the drawing:—

Figure 1 is a side view of a portion of a motor vehicle having the attachment;

Fig. 2 is a perspective view of the connecting means to the base of the pump;

Fig. 3 is a similar view of the clamp for the wheel, and,

Fig. 4 is a perspective view of the mechanism for connecting the pump rod to the clamp.

In the present embodiment of the invention, the pump comprises the usual cylinder 1, in which is movable a plunger operated by a plunger rod 2, which is provided at its outer end with a cross-head or handle 3. The base 4 of the pump is connected to the running board 5 of the motor vehicle, by means of the mechanism shown in Fig. 2.

This mechanism comprises a plate 6 having connected therewith a substantially U-shaped clamp 7, one of the arms of the clamp being secured to the plate as shown, while the other arm has threaded therethrough a set screw 8.

The plate 6 is arranged on the upper face of the running board, as shown in Fig. 1, with the set screw 8 beneath the running board and when the screw is turned, it will be evident that the plate will be clamped to the running board.

A second plate 9 is pivotally connected to the plate 6 in spaced relation by means of a bolt 10. This bolt is passed transversely through the plates 6 and 9, and is engaged by a nut 11 at the opposite end from the head of the bolt.

The bolt has a collar 12 between the plates to space them apart so that when the plate 6 is clamped upon the running board, the plate 9 will be far enough away from the edge of the plate 6 and from the running board to permit it to swing freely with respect to the plate 6. This plate 9 has an upstanding flange or rib 13 at the edge adjacent the plate 6, and at the other edge is a clamp 14 operated by a set screw 15. The base 4 of the pump is arranged between the rib 13 and the clamp 14, and by turning the set screw the base is clamped to the plate 9.

In Fig. 3 is shown mechanism for engaging the wheel. The said mechanism comprises a substantially U-shaped bracket 16, having threaded through one arm a set screw 17 and the other arm is provided with a laterally extending lug 18. The set screw has a saddle 19 pivoted thereto, and this saddle is adapted to engage beneath the hub 20 of one of the rear wheels 21, while the lug or lip 18 engages over the housing of the hub between a pair of spokes and at a point diametrically opposite the saddle 19. It will be evident that when the set screw is turned the clamp 16 will be firmly held to the wheel.

That arm of the clamp 16 which has the lip 18, carries also a plate 22, which is held in spaced relation with respect to the plane of the clamp by means of an integral arm 23, and this plate 22 has a series of transverse openings, the series extending longitudinally of the plate.

The means for pivotally connecting the cross head 3 of the pump 2 to the plate 22 is shown in Fig. 4. The said means comprises a clamp in the form of a plate 24 which has at one end an angle lug 25 and at the other two hooks 26. A set screw 27 is threaded through the lug 25, and this set screw has a pivoted saddle at its inner end. The plate 24 has a threaded stem 28 extending in the opposite direction to the lug and hooks, and this stem is adapted to pass through one of the openings in the plate 22, and to be engaged by a nut 29 at the opposite side of the plate. Thus the plate 24 is swiveled to the plate 22.

The plate 24 is connected to the cross head in the manner shown in Fig. 1. That is, the cross head is arranged between the hooks and the saddle of the set screw with the hooks engaging the handle on the opposite sides of the plunger rod, and it will be noticed that the saddle is mid-way between the hooks. When now the set screw is turned, the plate 24 will be firmly clamped to the cross head.

A hose 30 is connected with the pump for carrying the air pumped by the pump to the desired place of utilization, as for instance, a storage tank or automobile tire.

I claim:—

Means for connecting a pump to the running board of a motor vehicle comprising in combination with the pump and the base or foot plate thereof, of a pair of plates arranged edge to edge and pivotally connected to swing on an axis transverse to the plates, said plates being spaced apart at their adjacent edges to swing freely with respect to each other, one of the plates having a clamp for engaging the running board and the other a clamp for detachably engaging the foot plate or base of the pump.

JOHN WINFORD DUNN.

Witnesses:
B. McInernay,
F. J. Howell.